United States Patent
Chien et al.

(10) Patent No.: US 12,118,306 B2
(45) Date of Patent: Oct. 15, 2024

(54) MULTI-MODAL NETWORK-BASED ASSERTION VERIFICATION

(71) Applicant: AT&T Intellectual Property I, L.P., Atlanta, GA (US)

(72) Inventors: Ginger Chien, Bellevue, WA (US); Zhi Cui, Sugar Hill, GA (US); Eric Zavesky, Austin, TX (US); Robert T. Moton, Jr., Alpharetta, GA (US); Adrianne Binh Luu, Atlanta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 407 days.

(21) Appl. No.: 17/513,169

(22) Filed: Oct. 28, 2021

(65) Prior Publication Data
US 2023/0135293 A1    May 4, 2023

(51) Int. Cl.
G06F 40/279    (2020.01)
G06F 40/216    (2020.01)
G06F 40/237    (2020.01)
G06F 40/284    (2020.01)
G06F 40/30    (2020.01)

(52) U.S. Cl.
CPC .............................. G06F 40/279 (2020.01)

(58) Field of Classification Search
CPC .... G06F 40/279; G06F 40/216; G06F 40/237; G06F 40/284; G06F 40/30
See application file for complete search history.

(56) References Cited

U.S. PATENT DOCUMENTS

| | | | | |
|---|---|---|---|---|
| 11,836,452 | B2* | 12/2023 | Olabiyi | G06N 3/045 |
| 2010/0030638 | A1* | 2/2010 | Davis, III | G06Q 30/0254 |
| | | | | 709/204 |
| 2018/0373751 | A1* | 12/2018 | Qiao | G06F 16/2365 |
| 2021/0103623 | A1* | 4/2021 | Peterson | G06F 16/9538 |
| 2021/0157872 | A1* | 5/2021 | David | G06F 40/279 |
| 2021/0319099 | A1* | 10/2021 | Gaddam | H04L 63/1408 |

OTHER PUBLICATIONS

Revist Signos, Automatic Identification of Facts in Real Internet Texts in Spanish Using Lightweight Syntactic Constraints: Problems, Their Causes, and Ways for Improvement, vol. 48, No. 87, Mar. 2015, 28 pages.
Perez-Rosas, V., et al., "Automatic Detection of Fake News", ArXiv:1708.07104, Aug. 23, 2017, 10 pages.
(Continued)

*Primary Examiner* — Michael N Opsasnick

(57) ABSTRACT

A processing system may obtain first content including human language via a computing network. The processing system may next identify an assertion in the first content and identify one or more content sources containing second content relating to the assertion. The processing system may then determine whether the second content relating to the assertion corroborates or contradicts the assertion, and may present the first content with an indication of whether the second content corroborates or contradicts the assertion.

20 Claims, 4 Drawing Sheets

(56) References Cited

OTHER PUBLICATIONS

Chopra, S., et al., "Towards Automatic Identification of Fake News: Headline-Article Stance Detection with LSTM Attention Models", accessed on Oct. 12, 2021 from https://web.stanford.edu/class/archive/cs/cs224n/cs224n.1174/reports/2761028.pdf, 15 pages.
Umadevi, Dr. M. "Document Comparison Based on TF-IDF Metric", International Research Journal of Engineering and Technology (IRJET), vol. 07, Issue 02, Feb. 2020, 5 pages.
Thota, A. et al., "Fake News Detection: A Deep learning Approach", SMU Data Science Review, vol. 1, No. 3, Article 10, 2018, 21 pages.
The Stanford Natural Language Processing Group, "Stanford Open Information Extraction", accessed on Oct. 12, 2021 from https://nlp.stanford.edu/software/openie.html, 6 pages.

\* cited by examiner

MULTI-MODAL NETWORK-BASED ASSERTION VERIFICATION

The present disclosure relates generally to machine learning and natural language processing, and more particularly to methods, computer-readable media, and apparatuses for presenting first content with an indication of whether second content identified as relating to an assertion in the first content corroborates or contradicts the assertion.

BACKGROUND

Machine learning is a subset of artificial intelligence encompassing computer algorithms whose outputs improve with experience. A set of sample or "training" data may be provided to a machine learning algorithm, which may learn patterns in the training data that can be used to build a model that is capable of making predictions or decisions (outputs) based on a set of inputs (e.g., new data). Machine learning models may be used to automate the performance of repeated tasks, to filter emails, to provide navigation for unmanned vehicles, and to perform numerous other tasks or actions.

SUMMARY

In one example, the present disclosure describes a method, computer-readable medium, and apparatus for presenting first content with an indication of whether second content identified as relating to an assertion in the first content corroborates or contradicts the assertion. For example, a processing system including at least one processor may obtain a first content comprising human language via at least one computing network, identify at least one assertion in the first content, identify one or more content sources containing at least one second content relating to the at least one assertion, determine whether the at least one second content relating to the at least one assertion corroborates or contradicts the at least one assertion, and present the first content with an indication of whether the at least one second content relating to the at least one assertion corroborates or contradicts the at least one assertion.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
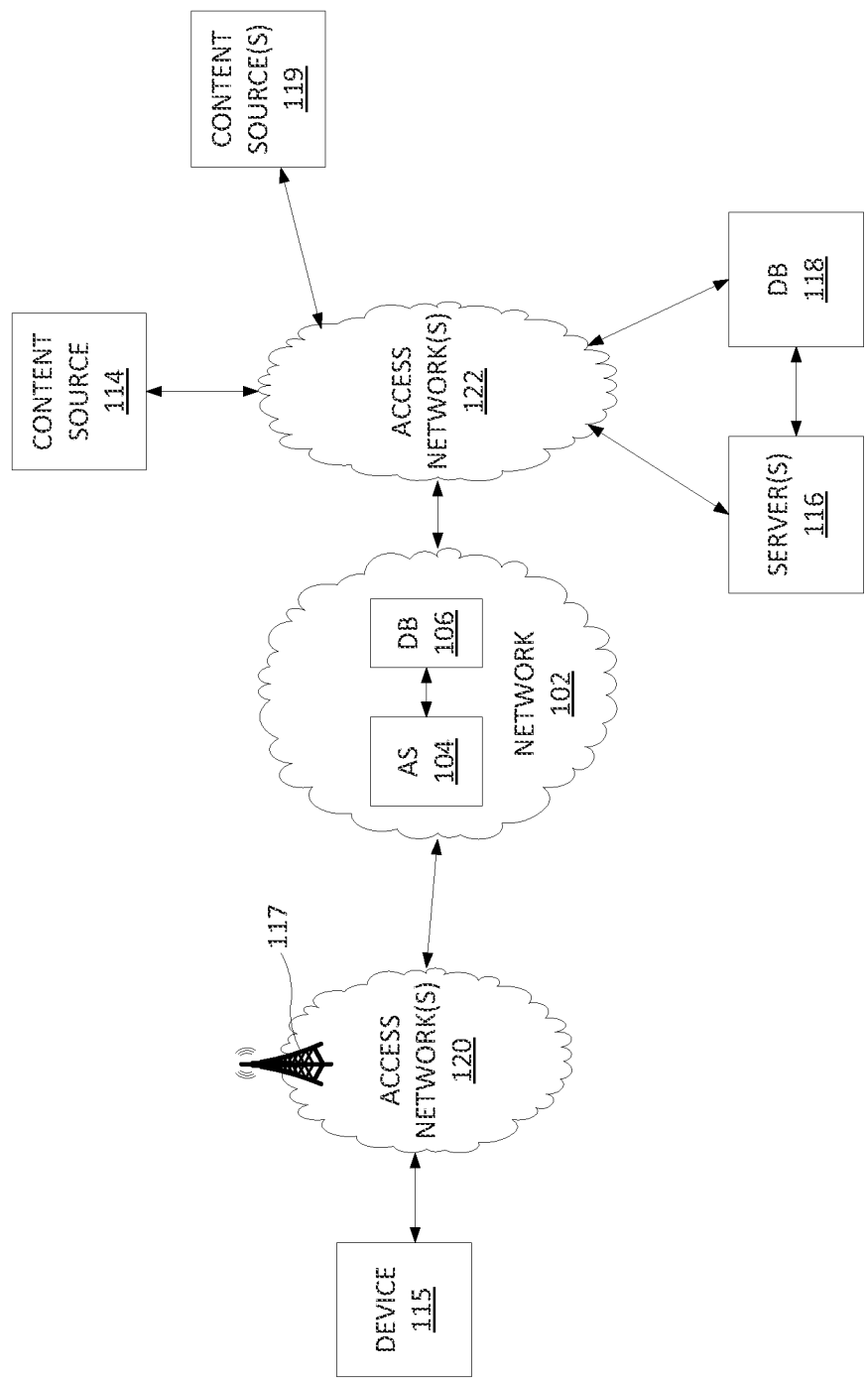
FIG. 1 illustrates an example network related to the present disclosure.

Examples of the present disclosure provide for methods, computer-readable media, and apparatuses for presenting first content with an indication of whether second content identified as relating to an assertion in the first content corroborates or contradicts the assertion. For instance, examples of the present disclosure enable accuracy or truthfulness of assertions to be corroborated (or refuted) by multiple content sources of varying types. Over time, the level of credibility of a corroborating source may also be maintained based on its level of agreement with other credible sources (broadly "trusted sources"), and used in selection of corroborating sources for assertion verification. To illustrate, information that is presented by a primary source for consumption by users may not accurately reflect data collected by other corroborating sources that may be used to either confirm or refute the information of the primary source. This may occur, for instance, when there is a presentation of information on a widely-accessible platform, such as an Internet website, a blog, social media, or other media for online distribution of information.

In one example, a primary content source may be a web server that provides information about a city's amenities, for instance a park. The present disclosure may comprise a network-based verification service (e.g., provided via one or more servers) and may include a verification application (app) or browser plug-in. Alternatively, corroboration software may be built into the primary content source server(s). In one example, a processing system of the present disclosure (e.g., a corroboration or verification system or server(s)) may analyze information from the primary content source prior to its presentation to a user. For example, the processing system may parse the content for meaning and context using natural language processing (NLP) or other text analysis techniques to characterize elements of the content. For example, based on textual analysis, the processing system may tag one or more statements as "assertions" e.g., verifiable assertions of fact or opinion. For instance, the content may include the sentence: "River Park is a vibrant, active park in the heart of River Town and encompasses nearly 100 acres." From this sentence, "River Park is a vibrant, active park," "[River Park is] in the heart of River Town," and "[River Park] encompasses nearly 100 acres," may be tagged as assertions for verification.

In one example, the processing system may alter the presentation of the content to the user such that some or all of the verifiable elements (e.g., assertions) may be identified. For example, the assertions may be highlighted, and a user may click on an assertion using a mouse and pointer via a user interface, or similarly via a touch screen in order to request verification. To accomplish a verification, the processing system may send a query to one or more corroborating sources, which may retrieve data to support or refute the assertion. Alternatively, or in addition, the processing system may access and search through data repositories or current data of the corroborating sources. For instance, the processing system may search a corroborating source database to identify and query three corroborating sources that are indicated in the corroborating source database to be trusted sources of data. For example, the processing system may query the corroborating sources with the assertion "River Park—encompasses—100 acres" and receive data from the corroborating sources that either agrees or disagrees with such assertion.

In other cases, the verification may include the retrieval or collection of sensor data. For instance, if a user requests verification of the assertion "River Park—is—a vibrant, active park," one mode for corroboration may be a trusted, corroborating source comprising an online encyclopedia. However, such a source may contain information that is opinion-based as well. In one example, the present disclosure may retrieve sensor data such as video and/or or audio recordings from a camera, microphone, etc., located in or near the park, or sensor-derived data. Thus, for example, the terms "vibrant" and "active" may correspond to a search for fact-based data in the form of videos, or interpretation of the content of the videos (or other types of sensor data) looking for "vibrant" and/or "active." For instance, examples of the present disclosure may apply machine learning-based, semantic concept detection model(s) for identifying semantic concepts in image and/or audio data.

In general, the present disclosure may use multiple corroborating sources (e.g., "multi-modal corroboration") to verify the accuracy or truthfulness of an assertion. For example, the verification of "River Park—is—a vibrant, active park" may use a first corroborating source comprising a number of public reviews that use similar terminology to describe the park. A second corroborating source may include a social media feed comprising announcements of a municipal recreation department which may include posts for different events conducted at the park, which may corroborate the accuracy of the assertion, or claim. A third corroborating source may be a set of sensor data available from a location of the park. This may be data from still and/or video cameras, weather sensors, motion sensors, thermal sensors, and any number of other types of sensors that may collect and provide sensor data from in and around an environment. The sensor data may be analyzed and used to define characteristics of the environment. For instance, video analysis of one or more videos from the park may determine that the park is very active with many visitors in the summer, that parking and social areas are crowded during Saturday night summer concerts, etc. The results of the multi-modal corroboration may be presented to the user, and may also include an option to view supporting data and/or to access the data source(s) to better judge the validity of the "vibrant, active" assertion.

It is again noted that sensor-based supporting data provided by a corroborating source may be interpreted and used in the verification process. The raw sensor data may also be made available to better inform the judgement of the user. For instance, the user may be presented with the option to view prior or real-time video from the park. The multi-modal corroboration may also be used to provide additional data points to a user so as to enable the user to make a more informed decision about the truthfulness of information presented by a primary source for any number of types of applications. For example, the present disclosure may be applied to verify assertions in social media postings, descriptions of products sold via online commerce websites or apps, postings of online news reports and opinions (which may be in text, audio, and/or video format), and so forth. In addition, statements of assertion that are identified in primary content may be presented in any number of forms. For instance, an assertion may be detected by the creation of text from a video and then applying an information extraction (IE) process (such as open IE, or the like) to identify relations (e.g., assertions). In one example, the present disclosure may adapt to a user's perceptions by enabling the user to provide subjective feedback. For instance, the user's perception of what is considered "vibrant" and/or "active" may be different from other users. Thus, the user may be provided with objective, neutral measures of "vibrancy" for example, while also pointing out the user may skew towards a higher or lower end of the scale when reporting results. In addition, the user's feedback may be used as an additional corroborating source for future inquiries that may relate to the park.

One or more sensors in an area may be configured such that, upon the detection of an incident in the area, the one or more sensors may begin the collection of data. This data may be collected in anticipation of a need for corroboration at a later time. For example, if a motion sensor, microphone, video camera, or other sensor devices in the area around a public space detect an unexpected amount of activity, such as a larger than normal amount of people in an area, the sensor may declare that an incident has occurred, or begun. The sensor may report this to the processing system, which may search a corroborating source database for other sensors available in the area that may begin collecting sensor data as well (e.g., for a period of time until the incident is declared to have ended, for example, due to a return to normal levels of activity).

Corroborating sources may earn a level of trust over time by a measure of how many times the corroborating sources agree with others (e.g., with already trusted sources, etc.). For example, one corroborating source may be identified as a "well-established, trusted source." As such, other corroborating sources may be measured against how often such sources agree with the well-established trusted source over various assertion verification tasks. Alternatively, or in addition, a user may identify one or more well-established trusted sources as ones against which all other corroborating sources are to be measured for that user. In one example, the processing system may adjust scores for sources (which, in one example, may be reset by the user at any time) based upon current and ongoing performance. In one example, if a corroborating source has a trust score that falls below a threshold, e.g., an average of 70% agreement rate with other sources, or the like, then it may be removed as a trusted corroborating source for that user (and/or for other users) for future use.

In addition, in one example, the present disclosure may learn through subjective feedback when a "well-established, trusted source" may become "untrusted" by a particular user. For instance, the user may provide feedback that indicates disagreement with an assessment of a park being "vibrant" or "active", which may contradict with a primary source and/or corroborating source. Alternatively, or in addition, the user may directly indicate that a source is no longer favored by the user, and thus to be removed from a list of available "well-established, trusted sources". For instance, in either scenario, a source may be a news site that is widely regarded as having journalistic integrity and providing truthful reporting. However, the user may have a strong divergence in taste with the news site's regular food critic, theater critic, movie critic, or the like. Thus, the user may prefer that these opinions not be used for corroboration of other sources. These and other aspects of the present disclosure are discussed in greater detail below in connection with the examples of FIGS. 1-4.

To further aid in understanding the present disclosure, FIG. 1 illustrates an example system 100 in which examples of the present disclosure for presenting first content with an indication of whether second content identified as relating to an assertion in the first content corroborates or contradicts the assertion may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a core network of a telecommunication network. The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3$^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like. In one example, each of access networks 120 and 122 may include at least one access point, such as a cellular base station, non-cellular wireless access point, a digital subscriber line access multiplexer (DSLAM), a cross-connect box, a serving area interface (SAI), a video-ready access device (VRAD), or the like, for communication with various endpoint devices. For instance, as illustrated in FIG. 1, access network(s) 120 include a wireless access point 117 (e.g., a cellular base station).

In one example, the access networks 120 may be in communication with various devices or computing systems/processing systems, such as device 115, and so forth. Similarly, access networks 122 may be in communication with one or more devices or processing systems (e.g., computing systems), e.g., content source 114, server(s) 116, database (DB) 118, content source(s) 119, etc. Access networks 120 and 122 may transmit and receive communications between device 115, content source 114, content source(s) 119, server(s) 116 and/or database (DB) 118, application server (AS) 104 and/or database (DB) 106, other components of network 102, devices reachable via the Internet in general, and so forth.

In one example, device 115 may comprise a mobile computing device, a cellular smart phone, a laptop, a tablet computer, a desktop computer, a wearable computing device (e.g., a smart watch, a smart pair of eyeglasses, etc.), an application server, a bank or cluster of such devices, or the like. In accordance with the present disclosure, device 115 may comprise a computing system or server, such as computing system 400 depicted in FIG. 4, and may be configured to perform operations or functions for presenting first content with an indication of whether second content identified as relating to an assertion in the first content corroborates or contradicts the assertion (such as illustrated and described in connection with the example method 300 of FIG. 3). For instance, device 115 may include an application (app), a browser plug-in, or the like for assertion verification, and which may establish communication with server(s) 116 and/or content source(s) 119 to access primary content, secondary content containing information regarding assertions identified in the requested primary content, and so forth.

Figure 4:
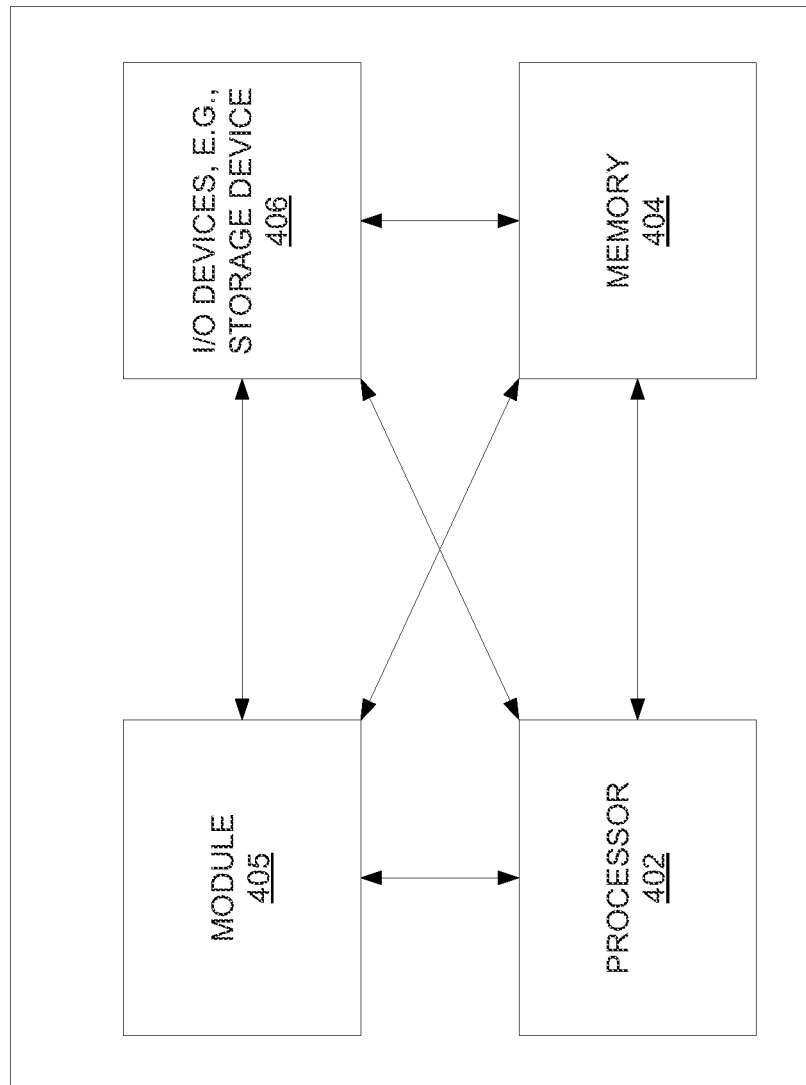
FIG. 4 illustrates a high level block diagram of a computing device specifically programmed to perform the steps, functions, blocks and/or operations described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

Content source 114 may comprise one or more servers providing one or more types of content, such as text, audio, video, multimedia, etc. For instance, content may include blogs, video logs (v-logs), podcasts, text, video, audio news stories, reviews, descriptions, debates, opinions, articles, digital books or magazines, and so forth. For instance, content source 114 may comprise one or more servers (e.g., a web server). In one example, content source 114 may include a database comprising one or more physical storage devices integrated with such a server, or servers (e.g., database server(s)), attached or coupled to the server(s), or remotely accessible to the server(s) to store various content, or content items, e.g., individual articles, stories, videos, audio tracks or clips, social media posts, and so forth.

Similarly, content source(s) 119 may comprise one or more servers (e.g., web server(s) and/or database server(s)) of one or more content sources providing various types of content of the same or a different nature from content source 114. In one example, content source(s) 119 may further include one or more sensor devices and/or a sensor data database. For example, such sensors may include network-connected sensors for measuring environmental conditions, such as a thermometer, a barometer, a humidity sensor, a decibel meter, a light sensor, a microphone, a camera, and so on. In addition, such sensors may be fixed location sensors and/or mobile sensors, such as a sensor-equipped autonomous aerial vehicle (AAV) with a camera, microphone, and/or other sensors, one or more radio frequency (RF) transceivers for cellular communications and/or for non-cellular wireless communications, etc. In one example, each of the content source(s) 119 may communicate independently with access network(s) 120. In another example, one or more of the content source(s) 119 (e.g., sensor devices) may comprise a peripheral device that may communicate with remote devices, servers, or the like via access networks 120, network 102, etc. via another endpoint device, such as a smart home hub, a home gateway or router, or the like. Thus, one or more of these sensor devices may have a wired or wireless connection to another local device that may have a connection to access networks 120.

As illustrated in FIG. 1, access networks 122 may be in communication with one or more servers 116 and one or more databases (DB(s)) 118. In accordance with the present disclosure, each of the server(s) 116 may comprise a computing system or server, such as computing system 400 depicted in FIG. 4, and may individually or collectively be configured to perform operations or functions for presenting first content with an indication of whether second content identified as relating to an assertion in the first content corroborates or contradicts the assertion (such as illustrated and described in connection with the example method 300 of FIG. 3). For instance, server(s) 116 may host an assertion verification service via which assertion identification and/or verification may be requested, and via which verification results may be provided to requesting entities, such as device 115.

In one example, DB(s) 118 may comprise one or more physical storage devices integrated with server(s) 116 (e.g., a database server), attached or coupled to the server(s) 116, or remotely accessible to server(s) 116 to store various types of information in support of systems for presenting first content with an indication of whether second content identified as relating to an assertion in the first content corroborates or contradicts the assertion, in accordance with the present disclosure. For example, DB(s) 118 may include a content source database that may store information about various content sources, such as, for each content source: a type (or types) of content of the content source, uniform resource locators (URLs) or other identifiers to access the content source, the content of the content source, a trust rating or score for the content source, and so forth. For example, DB(s) 118 may include a record for each of content source 114 and content source(s) 119. In the case of a sensor data source, the record may include a location of the sensor, the type of sensor data, the dates and/or times for which sensor data is available, and so on. In one example, DB(s) 118 may comprise a program, logic, instructions, etc. for use in identifying relations in text (e.g., "assertions"), for matching contents to each other, and so on. For instance, DB(s) 118 may include a thesaurus, an information extraction (IE) program, a word association graph, etc. DB(s) 118 may also store machine learning models (MLMs) for detecting semantic content in video and/or audio data, and so forth.

In an illustrative example, a user, via device 115, may seek content from content source 114, e.g., a social media post by another. In one example, device 115 may obtain the content (e.g., "primary content") from content source 114 and may provide the content to server(s) 116, or may request the content from content source 114 via server(s) 116. Thus, in either case, server(s) 116 may obtain the content. Server(s) 116 may then perform a process to identify assertions (e.g., statements of truth or opinion) in the content. For example, server(s) 116 may apply an information extraction (IE) process, such as open IE, to textual content in order to identify at least one assertion. In addition, the output/result may comprise a representation of the at least one assertion as a formal relation (e.g., a binary relation, or other formal relations). Server(s) 116 may then present the content to the user via device 115 with annotations to the requested content indicating the assertion(s) that is/are identified. Device 115 may also present an option to the user to have any such assertion verified for accuracy/truthfulness. It should be noted that an IE process may be applied to the content in textual form, such as a social media post, news article, story, a user initiated search, etc. For content that is not in text form, such as video and/or audio content, server(s) 116 may first perform a speech-to-text conversion to generate a text transcript of the content, and may then apply an IE process to the text transcript.

Continuing with the present example, it may be assumed that the user selects to have an assertion verified, such as by clicking on a highlighted portion of text corresponding to the assertion within the content as presented via a display screen of device 115, for instance. This selection/instruction may be notified by device 115 to server(s) 116, which may then continue with a process to verify the assertion. For example, server(s) 116 may identify additional content from content source(s) 119 that may corroborate or refute the statement/assertion. In one example, content source(s) 119 may comprise content sources having trust ratings above a threshold, e.g., as either assigned by a user of device 115 or with respect to the collective ratings of a plurality of users, as determined by a percentage or number of times a content source agrees with other "trusted content sources," e.g., those also having trust ratings above a threshold, or wherein the trust ratings may be based upon a plurality of such factors and/or additional or alternative factors of the same or a similar nature, such as whether the source is associated with a governmental agency, whether the source is a sensor device (e.g., it may be considered highly unlikely that a sensor device providing a video feed is presenting false data), and so on.

Among the trusted content source(s), server(s) 116 may identify content from content source(s) 119 (e.g., "secondary content") that may be relevant to the topic of the primary content from content source 114. For example, server(s) 116 may generate a term frequency-inverse document frequency (td-idf) vector representing the primary content (or may access such a vector that may already be generated and stored by content source 114). Server(s) 116 may similarly generate or access td-idf vectors representing respective contents from content source(s) 119, and may compare these td-idf vectors to the td-idf vector representing the primary content, such as by applying a cosine similarity calculation. For example, the td-idf vectors may be generated for the primary content and/or the secondary content in text form, or from text transcripts that may be generated from the primary content and/or the secondary content in non-text form (e.g., video or audio). Those secondary content items having the highest cosine similarity measures (e.g., the top three, the top five, the top ten, etc.) and/or cosine similarity measures above a threshold (e.g., above a similarity measure above 0.70, above 0.75, etc.) may be selected as being "relevant." It should be noted that other processes of determining relevant content (e.g., similar content) may be applied, such as using different types of feature/vector representations of the respective content, using a different distance/similarity metric, such as Euclidean distance, Jaccard similarity, etc. In one example, server(s) 116 may also apply a semantic enrichment/enhancement process (or context enhancement/enrichment process) to the primary content and/or to the secondary content. For instance, a language database with known synonyms may be used to add additional words or phrases and metadata terms to be included in a td-idf vector generation or similar process.

Server(s) 116 may next identify statements/assertions within the secondary content that is found relevant. For instance, server(s) 116 may again apply an information extraction (IE) process to identify assertions in the secondary content and generate formal relations (e.g., binary relations) of any such identified assertions. Server(s) 116 may then compare the assertions within the secondary content to the assertion to be verified in order to determine if any of the assertions in the secondary content either corroborate (e.g., are the same or within an acceptable or predefined tolerance) or refute the assertion to be verified (e.g., comprising a negation of the assertion to be verified). For instance, the assertion to be verified and the assertion(s) identified in the secondary content may each be represented as a formal relation that can be compared. In one example, server(s) 116 may also apply a semantic enrichment/enhancement process (or context enhancement/enrichment process) to the assertions. For instance, in order to declare the assertions "It is raining—in—the Big Apple" and "It is raining—in—New York City" to be equivalent, the server(s) 116 may consider permutations of the assertions with known synonymous terms, such as from an online/electronic thesaurus and/or a word association graph (e.g., substituting "New York City" for "Big Apple" in either or both assertions, and declaring equivalence when one of the combinations matches).

The server(s) 116 may use other contextual data in this process, such as location data. For instance, a news site based in California and that focuses on local news may have a headline "Governor is on vacation." The target audience of human readers will generally understand that it is the Governor of California being referred to, which is implied by the source of the headline being a local California new site. However, there may be numerous other states having governors who are not on vacation, which may be documented via various news stories or other content. Thus, without the location context, the server(s) 116 might erroneously identify false contradictory content. Accordingly, in one example, the assertion "Governor—is on—vacation" may be enhanced to "Governor [of California]—is on—vacation." Temporal data may further enrich the context and inform the comparison of two assertions. For instance, old articles from April about the Governor attending a conference should not be taken to contradict an assertion that the "Governor—is [currently, e.g., in September] on—vacation." Thus an assertion from an article in April that "Governor—attends—business leader summit" should be qualified to "Governor—[attended in April]—business leader summit." As such, this assertion should be considered irrelevant (e.g., neither contradictory nor confirmatory) of the assertion to be verified that "Governor—is [currently in September] on—vacation."

As noted above, secondary content from content source(s) 119 may include sensor data. In this case, the relevance of sensor data to the assertion may be determined in a different way. For example, sensor data content may be determined relevant in a number of ways, such as identifying a location or geographic relevance of the assertion to be verified. It should be noted that sensor data may not be relevant to all assertions (such as "5,000,000 people tuned in to last night's game"). In this case, microphones and cameras deployed throughout a city may be irrelevant or impractical. However, for the assertion "It is raining—in—New York City," a video or audio feed from a camera and/or microphone within New York City may include proof of such rain (or lack thereof), and similarly for a rain sensor. As such, server(s) 116 may first determine if there is a geographic or locational component of the assertion, and if so, whether there are sensor devices (or sensor data from such sensor devices) that may corroborate or refute such assertion. When such sensor device(s) is/are available, server(s) 116 may then access these sensor devices and/or data collected therefrom (e.g., represented by one or more of content source(s) 119) to access the geographically (and temporally) relevant sensor data to determine whether such data confirms or contradicts the assertion to be verified. Alternatively, or in addition, one or more sensor devices and/or sensor device data repositories (e.g., one or more of content source(s) 119) may be queried by server(s) 116 and may respond with a yes answer or a no answer. For example, server(s) 116 may submit a query "Is it currently raining in New York City" and the one or more of content source(s) 119 may interpret the query, access the relevant sensor data, and provide responses accordingly. For instance, in such an example, additional intelligence and processing is provided via the content source(s) 119 rather than server(s) 116 making such determination from the sensor data.

In the case of video or audio data, in one example server(s) 116 may apply various semantic content detection models for identifying relevant semantic content/features within the video and/or audio data. For example, a detection model for the semantic content of "raining" may be applied to detect from a video whether it is or is not raining within the visual content of the video. For instance, server(s) 116 may use one or more object detection/recognition models (or concept/theme detection models for identifying objects, events, or other semantic concepts or themes, e.g., "car," "person," "tree," "fire," "raining," "snowing," "party," "fighting," etc.). To illustrate, in order to detect "raining" in image data, server(s) 116 may store a detection model. This may include one or more images of rain (e.g., from different angles, in different scenarios, etc.), and may alternatively or additionally include feature set(s) derived from one or more images and/or videos of rain, respectively. For instance, server(s) 116 may store a respective scale-invariant feature transform (SIFT) model, or a similar reduced feature set derived from image(s) of rain, which may be used for detecting additional instances of rain in visual information of secondary content from content source(s) 119 via feature matching. Thus, in one example, a feature matching detection algorithm employed by server(s) 116 may be based upon SIFT features. However, in other examples, different feature matching detection algorithms may be used, such as a Speeded Up Robust Features (SURF)-based algorithm, a cosine-matrix distance-based detector, a Laplacian-based detector, a Hessian matrix-based detector, a fast Hessian detector, etc.

The visual features used for detection of rain (or "raining") or other semantic content (such as different types of objects/items, events, weather, actions, occurrences, etc.) may include low-level invariant image data, such as colors (e.g., RGB (red-green-blue) or CYM (cyan-yellow-magenta) raw data (luminance values) from a CCD/photosensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like.

In one example, server(s) 116 may perform an image salience detection process, e.g., applying an image salience model and then performing an image recognition algorithm over the "salient" portion of the image(s) or other image data/visual information from content source(s) 119. Thus, in one example, visual features may also include a length to width ratio of an object, a velocity of an object estimated from a sequence of images (e.g., video frames), and so forth. Similarly, in one example, server(s) 116 may apply an object/item detection and/or edge detection algorithm to identify possible unique items in the visual information from content source(s) 119 (e.g., without particular knowledge of the type of item; for instance, the object/edge detection may identify an object in the shape of a person in a video frame, without understanding that the object/item is a person). In this case, visual features may also include the object/item shape, dimensions, and so forth. In such an example, object/item recognition may then proceed as described above (e.g., with respect to the "salient" portions of the image(s) and/or video(s)).

In one example, the detection of objects/items or other areas of interest within images and their locations and/or positions in the visual data of secondary content from content source(s) 119 may be in accordance with one or more machine learning algorithms (MLAs), e.g., one or more trained machine learning models (MLMs). For instance, a machine learning algorithm (MLA), or machine learning model (MLM) trained via a MLA may be for detecting a single object/item, or may be for detecting a single item from a plurality of possible items that may be detected via the MLA/MLM. For instance, the MLA (or the trained MLM) may comprise a deep learning neural network, or deep neural network (DNN), such as convolutional neural network (CNN), a generative adversarial network (GAN), a support vector machine (SVM), e.g., a binary, non-binary, or multi-class classifier, a linear or non-linear classifier, and so forth. In one example, the MLA/MLM may be a SIFT or SURF features-based detection model, as mentioned above. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. In one example, the object detection MLM(s) may be trained at a network-based processing system (e.g., server(s) 114) and deployed to content source(s) 119 (e.g., web/database servers containing secondary content in the form of image data). It should also be noted that various pre-processing or post-recognition/detection operations may also be applied. For example, server(s) 116 may apply an image salience algorithm, an edge detection algorithm, or the like (e.g., as described above) where the results of these algorithms may include additional, or pre-processed input data for the one or more MLAs.

Similarly, server(s) 116 may generate, store, and/or use various speech or other audio detection models, which may be trained from extracted audio features from one or more representative audio samples, such as low-level audio features, including: spectral centroid, spectral roll-off, signal energy, mel-frequency cepstrum coefficients (MFCCs), linear predictor coefficients (LPC), line spectral frequency (LSF) coefficients, loudness coefficients, sharpness of loudness coefficients, spread of loudness coefficients, octave band signal intensities, and so forth, wherein the output of the model in response to a given input set of audio features is a prediction of whether a particular semantic content is or is not present (e.g., the sound of breaking glass (or not), the sound of rain (or not), etc.). For instance, in one example, each audio model may comprise a feature vector representative of a particular sound, or a sequence of sounds.

It should be noted that server(s) 116 may also average and/or aggregate the results of comparing the assertion to secondary content (in the case where multiple relevant secondary content items are identified), and may present the results to the user via device 115, such as "3 trusted sources agree" or "80 percent of trusted sources agree," etc. For instance, server(s) 116 may provide the results to device 115, which may cause the results to be presented in any number of formats. In one example, server(s) 116 may include one or more links for device 115 to display or to use in response to a user selection to obtain or otherwise access the secondary content that corroborates and/or refutes the assertion in the primary content.

It should again be noted that any number of server(s) 116 or database(s) 118 may be deployed. In one example, network 102 may also include an application server (AS) 104 and a database (DB) 106. In one example, AS 104 may perform the same or similar functions as server(s) 116. Similarly, DB 106 may store the same or similar information as DB(s) 118 (e.g., content source database, thesaurus, word association graph, context enrichment models, etc.). For instance, network 102 may provide a service to subscribing websites and/or user devices in connection with an assertion verification service, e.g., in addition to television, phone, and/or other telecommunication services. In one example, AS 104, DB 106, server(s) 116, and/or DB(s) 118, device 115, content source 114, and/or content source(s) 119, may operate in a distributed and/or coordinated manner to perform various steps, functions, and/or operations described herein.

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like, for packet-based streaming of videos or video segments that may be provided in accordance with the present disclosure. Similarly, although only two access networks 120 and 122 are shown, in other examples, access networks 120 and/or 122 may each comprise a plurality of different access networks that may interface with network 102 independently or in a chained manner. For example, content source 114, content source(s) 119, and server(s) 116 may be in communication with network 102 via different access networks, and so forth. Thus, these and other modifications are all contemplated within the scope of the present disclosure.

Figure 2:
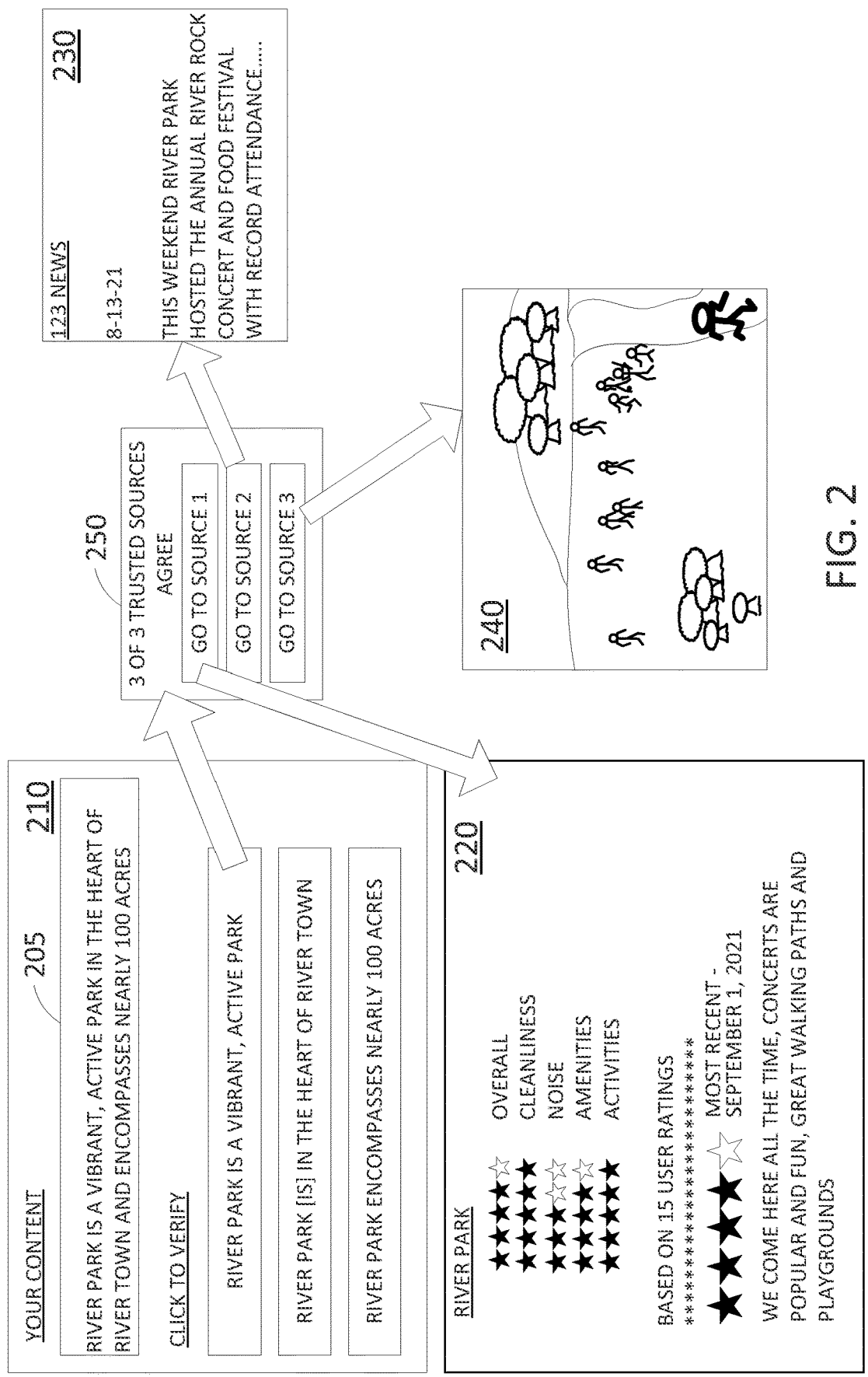
FIG. 2 illustrates an example of identifying assertions in a primary content, identifying relevant secondary content regarding a selected assertion, and providing verification results via a user interface, in accordance with the present disclosure.

To further aid in understanding the present disclosure, FIG. 2 illustrates an example of identifying assertions in a primary content, identifying relevant secondary content regarding a selected assertion, and providing verification results via a user interface. For instance, primary content 205 may be presented via a display of a user endpoint device navigating via a web browser to a website that offered the primary content, or via an app running in the endpoint device and associated with the primary content and/or an assertion verification service, or the like. In example screen 210, the primary content 205 may be presented, such as a webpage about "River Park" that contains the following text describing the park: "River Park is a vibrant, active park in the heart of River Town and encompasses nearly 100 acres." In accordance with the present disclosure, an assertion verification application, process, service, or the like may operate on the user endpoint device and/or a network-based processing system (e.g., one or more servers), and may scan the text to identify assertions. For instance, this may be achieved via an information extraction (IE) process such as discussed above. In one example, the result is one or more formal relations, e.g., binary relations, such as: "River Park—is—a vibrant, active park," "[River Park]—is in—the heart of River Town," and "[River Park]—encompasses—nearly 100 acres," may be extracted as formal relations/assertions that may be selected for verification by the user. However, as illustrated in FIG. 1, the user may be presented with the identified assertions in a more user-friendly format, such as closer to the original language. In one example, these may comprise buttons that are clickable or otherwise selectable via a graphical user interface (GUI), such as by pointing and clicking with a mouse, touching a corresponding portion of the display, or screen, etc. In the example of FIG. 2, the user may select the assertion "River Park is a vibrant, active park" for verification.

Next, the user endpoint device and/or network-based processing system may identify relevant secondary content 220, 230, and 240 from one or more content sources. In one example, the content sources may be "trusted content sources" having trust ratings exceeding a threshold trust rating, such as having a trust rating over 70, over 80, etc. (e.g., on a scale of 0 to 100, where 100 indicates that a content source is completely trusted by all users and/or specifically by the user). For illustrative purposes, three relevant secondary content 220, 230, and 240 may be identified. For instance, a review website may contain ratings/reviews for various things, such as restaurants, accommodations, transit providers, goods, services, parks, theaters, and so on. In this case, the review website may include a review of River Park (e.g., secondary content 220). For instance, details of the review may be accessible via a webpage, or pages, and may include overall ratings, a list of individual user ratings, various user comments, and so forth. Alternatively, or in addition, the review data may be accessible to the user endpoint device and/or network-based processing system via one or more application programming interfaces (APIs) via which the review data may be obtained, e.g., without necessarily being displayed in an accessed webpage via a web browser, or the like. In one example, secondary content 220 may be determined to be relevant by characterizing the primary content 205 and the secondary content 220, such as by generating td-idf vectors, and then determining cosine similarity, or the like. In one example, secondary content 220 may also include assertions which can be similarly formalized and compared to the assertion from the primary content 205 in order to determine whether the secondary content confirms or contradicts the assertion. However, in another example, the secondary content may not include a direct affirmation or negation of the assertion, but may include sematic content which would be indicative of one or the other conclusion.

In one example, a secondary content, such as secondary content 220, may be scored as being confirmatory or contradictory of the assertion, such as on a scale of zero to 100, with zero being contradictory and 100 being completely confirmatory. For instance, words and phrases from the secondary content 220 may be extracted and scored based upon a degree of relatedness to the concept of "vibrant" and/or the concept of "active." In one example, antonymous concepts (words or phrases) may be assigned a negative score, synonymous concepts may be assigned a relatively high positive score, and words or phrases that are related but not synonymous may be assigned a lesser positive score. Synonymous and antonymous concepts may be determined using an electronic thesaurus, for example. Associated words or phrases (and a degree of relation) may be determined via a word association graph (e.g., spanning the entire English or other languages, a subset of the language focusing on a specialized topic or area (e.g., government and politics, travel and leisure, work, technology, etc.), and so on). For example, links may represent associations between words and/or phrases and the link weights may indicate a degree of relatedness. In one example, a link/edge may represent a negative association and a link weight may be negative to account for such relationship. In one example, the link/edge weights between a word or phrase in secondary content 220 and a word or phrase of the assertion may be the score for that word or phrase in the secondary content 220. The scores of each word and/or phrase may be summed to give an overall score. In one example, scores may be segregated into three bands: contradictory being the lower scores (e.g., including negative scores, in one example), neutral (e.g., mid-range scores), and confirmatory (e.g., the highest scores, above the mid-range scores). In this regard, it should also be noted that some secondary content may be found relevant, but the content thereof may be found to neither confirm nor contradict the assertion (e.g., a mid-range score, for example). In one example, a summed score may be divided by the total number of words in the secondary content 220 or otherwise scaled (e.g., so as to make all scores fall within the range zero to 100). Secondary content 230 may be similarly identified and scored, and may comprise a news article on a website of "123 News" from Aug. 13, 2021, which describes an event that took place at River Park.

Secondary content 240 may comprise a video of the park recorded and/or streamed from a camera within the park or nearby. In one example, the video may be archived and accessed via a repository (e.g., a storage server or servers). In another example, the camera may be identified as being geographically relevant to the assertion (e.g., located in or near "River Park") and a current video feed/stream from the camera may be obtained. In one example, the user endpoint device and/or network-based processing system may apply various semantic content detection models for identifying relevant semantic content/features within the video and/or audio data. For example, different models may be applied to the video to identify the concepts of "park," "nature," "baseball," "group," "jogging," "trees," "hill," and so forth. In general the types of semantic concepts that are detectable may depend upon the types of semantic concept detection models that are available for use and/or actively used in this specific instance. In one example, these identified concepts/themes may be correlated to one or both of the terms "vibrant" and "active" to determine that the secondary content 240 is corroborative of the assertion "River Park—is—a vibrant, active park." For instance, the correlation may be quantified based upon relations identified via a thesaurus and/or word association graph. Alternatively, or in addition, there may be a semantic concept detection model, or models, for either or both of the concepts of "vibrant" and "active," where such detection model(s) may be applied to the video of the secondary content 240 to identify whether such concept(s) is/are present (or not).

As further illustrated in FIG. 2, a user may be presented with results 250 of the verification process. For instance, the results 250 may be presented as a pop-up window over screen 210, as an additional block of visual information within screen 210, such as a side-bar, a bottom-bar, or the like. In the present example, the outcome of the verification may be presented as "3 of 3 trusted sources agree." However, in other, further, and different examples, the outcome may be presented in any number of forms, such as "100% of trusted sources agree," or such other percentage or amount as the outcome indicates, a slider bar indicating the percentage of agreement with the assertion, etc. The results 250 may also include buttons linking to the secondary content 220, 230, and 240 upon which the results 250 are based. Alternatively, or in addition, snippets or samples of the secondary content 220, 230, and/or 240 may be presented in the results 250, e.g., a representative sample of text from secondary content 220 and/or secondary content 230, a thumbnail size still image from the secondary content 240, etc.

It should be noted that the foregoing are merely several examples of the presentation of primary content, available types of secondary content, the presentation of verification results, and so on. Thus, other, further, and different example screens and/or user interface(s) may be utilized in various designs, different types of secondary content may be accessed for verification and may be presented for further consideration by a user, and so forth. For instance, as noted above, some secondary content may be found relevant, but the content thereof may be found to neither confirm nor contradict the assertion. This outcome may therefore be indicated in various ways in the result, such as including an indication of a number or percentage of "neutral" secondary sources and/or secondary content. Thus, these and other modifications are all contemplated within the scope of the present disclosure.

Figure 3:
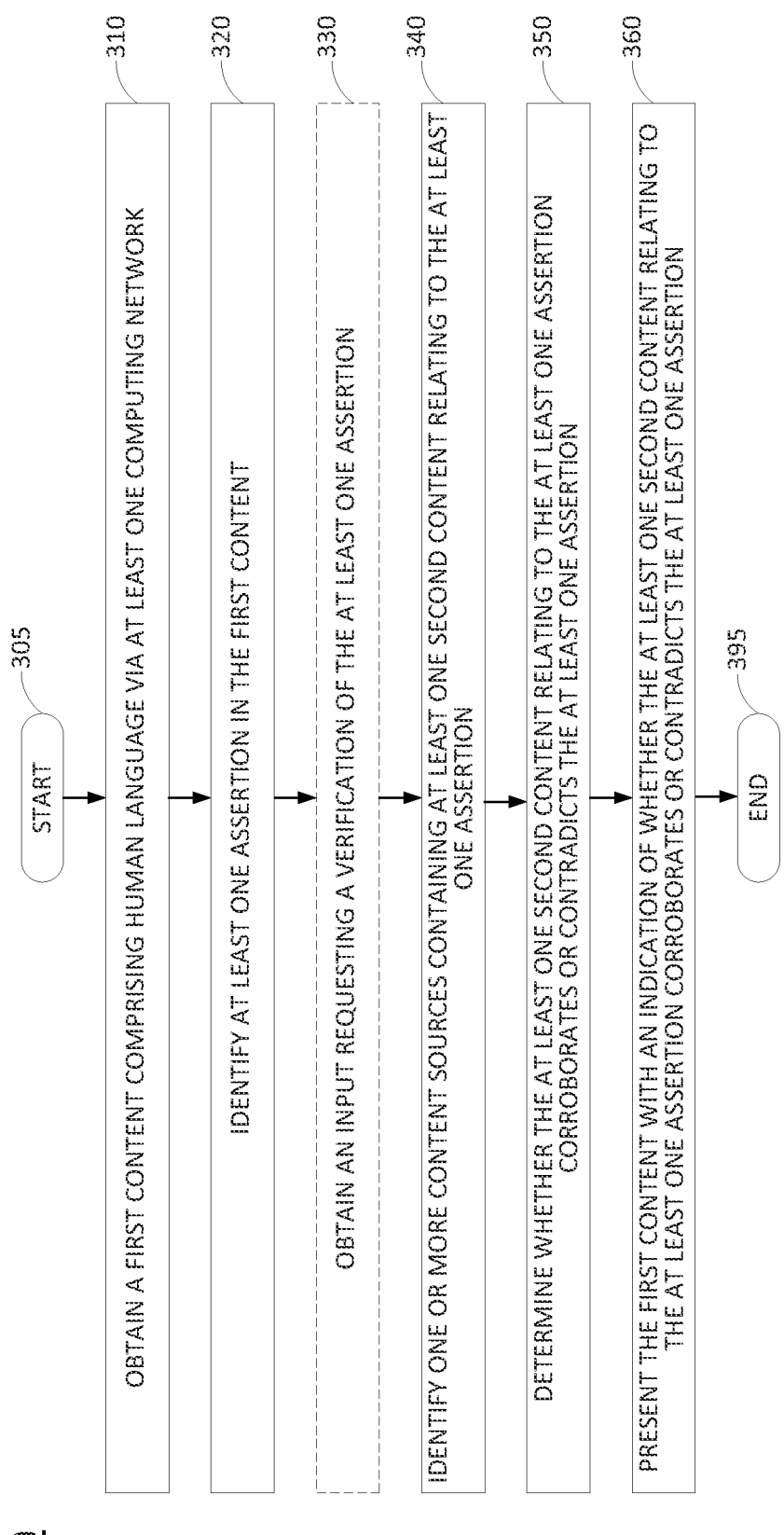
FIG. 3 illustrates a flowchart of an example method for presenting first content with an indication of whether second content identified as relating to an assertion in the first content corroborates or contradicts the assertion.

FIG. 3 illustrates a flowchart of an example method 300 for presenting first content with an indication of whether second content identified as relating to an assertion in the first content corroborates or contradicts the assertion, in accordance with the present disclosure. In one example, the method 300 is performed by a component of the system 100 of FIG. 1, such as by server(s) 116, application server 104, device 115, and/or any one or more components thereof (e.g., a processor, or processors, performing operations stored in and loaded from a memory), by server(s) 116, application server 104, and/or device 115 in conjunction with one or more other devices, such as DB 106, DB(s) 118, content source 114, content source(s) 119, and so forth. In one example, the steps, functions, or operations of method 300 may be performed by a computing device or system 400, and/or processor 402 as described in connection with FIG. 4 below. For instance, the computing device or system 400 may represent any one or more components of a device, server, and/or application server in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and proceeds to step 310.

At step 310, the processing system obtains a first content comprising human language via at least one computing network. In one example, the first content may comprise text, such as an article, a text message (e.g., a Short Message Service (SMS) message or the like), a social-media posting, a posting to an online forum, a comment added to comment section for an online media content, a research result from a browser, and so forth. In another example, the first content may comprise speech, which may be extracted from a video or which may comprise non-video audio content, such as podcast or other recorded or broadcast audios.

At step 320, the processing system identifies at least one assertion in the first content. In one example, step 320 may include creating a representation of the at least one assertion as a formal relation, e.g., a binary relation, etc. In an example in which the first content comprises speech, step 320 may include converting the speech-to-text via a speech recognition process.

At optional step 330, the processing system may obtain an input requesting a verification of the at least one assertion. For instance, a user may click a button via a graphical user interface or provide an input in a different form to indicate the request for the verification. In one example, the at least one assertion identified at step 320 may be indicated as a recognized assertion via the graphical user interface, e.g., via a display screen of a user endpoint device, an augmented reality (AR) headset, or the like.

At step 340, the processing system identifies one or more content sources containing at least one second content (e.g., "secondary content") relating to the at least one assertion. The at least one second content may comprise the same or different type of content as the first content, e.g., text content, video or other image content, audio content, etc. For instance, in the case of text sources, the one or more content sources may comprise an online news source, a review website, an online journal, an online article repository, an online encyclopedia, or the like.

In one example, the one or more content sources may comprise at least one sensor device, and the at least one second content may comprise sensor data collected from the at least one sensor device. For instance, the sensor device may comprise a camera, a microphone, or other sensor devices, such as a rain sensor, a humidity sensor, and so on. In one example, step 340 may include identifying features from the sensor data, such as semantic features, or features that can be more directly derived (e.g., is it raining/not raining in River Park can be derived semantically from video or audio, or can be derived from rain sensor data directly). The at least one sensor device may be deployed at a location that is geographically relevant to the at least one assertion. For instance, it may be determined that the at least one assertion relates to the location either by direct reference to the location in the assertion and/or in the first content, or by semantic enhancement of the first content to infer that the first content and the assertion relates to the location (e.g., when it is a New York-based news site referring to "Central Park" without providing further specification as to "Central Park, New York City, NY," the semantic enhancement may make this association, rather than associating "Central Park" with another park having the same name but located elsewhere).

In one example, step 340 may include obtaining the at least one second content, calculating a term frequency-inverse document frequency (td-idf) metric between the at least one second content and the first content, and determining that the at least one second content relates to the at least one assertion in response to the td-idf metric exceeding a threshold td-idf metric. In one example, step 340 may further include generating a td-idf vector for each of the first content and the at least one second content. In one example, the metric may be based upon a cosine similarity or other distance/similarity metrics. In one example, step 340 may include applying a semantic enhancement process to at least one of the first content or the at least one second content to add additional relevant terms to the at least one of the first content or the at least one second content. In such case, the td-idf metric or similar similarity metric may be based at least in part upon the additional relevant terms.

In one example, step 340 may include identifying the one or more content sources from among content sources having trust ratings above a threshold trust rating (e.g., having a trust rating above the threshold in addition to containing second content that is related). For instance, for each content source, a trust rating may be based upon at least one of: a user rating by a user to whom the first content is presented, or a number of times or a percentage of agreement with other content sources having trust ratings above the threshold trust rating regarding other assertions. In one example, a content source comprising a sensor device may have a trust rating of 100 (e.g., where trust ratings may be on a scale of zero being completely untrusted to 100 being completely trusted). In another example, a sensor device trust rating may be set to some other values, such as 95 percent, 98 percent, e.g., based upon a user considering or the processing system accounting for a very small likelihood that the sensor data may be tampered with, for instance.

At step 350, the processing system determines whether the at least one second content relating to the at least one assertion corroborates or contradicts the at least one assertion. In one example, step 350 may include identifying at least a second assertion in the at least one second content. For instance, this may comprise creating a representation of the at least the second assertion as a second formal relation. In this regard, step 350 may include the same or similar operations as step 320. In addition, step 350 may include determining whether the second formal relation comprises an affirmation of the formal relation or a negation of the formal relation (e.g., the affirmation of the formal relation may corroborate the at least one assertion, and the negation of the formal relation may contradict the at least one assertion). In one example, step 350 may include scoring the at least one secondary content based upon the words and/or phrases therein in association with the words, phrases, and/or concepts added via semantic enhancement (e.g., additional words and/or phrases, such as synonyms) of the at least one assertion. For example, text of the at least one secondary content may be scored using a word association graph, the links/edges and weights thereof, etc. and/or a thesaurus with synonyms (and in one example, also including antonyms).

At step 360, the processing system presents the first content with an indication of whether the at least one second content relating to the at least one assertion corroborates or contradicts the at least one assertion. For instance, the presentation may be such as illustrated in the results 250 of FIG. 2, or a similar presentation, e.g., depending upon the particular type of user device and its capabilities, the app and/or browser configuration via which the first content is accessed, and so forth. In one example, step 360 may include presenting one or more links or otherwise offering access to the at least one second content for a user to consider these corroborating (or contradicting) material(s) directly on his or her own.

Following step 360, the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example the processor may repeat one or more steps of the method 300 for an additional first content (e.g., a different content item), for additional assertions within the first content, and so forth. In one example, the method 300 may include obtaining a user selection to access a second content, and directing a user endpoint device to the second content and/or providing the second content to the user endpoint device. In one example, the method 300 may include obtaining a user selection to access the first content, and obtaining the first content, e.g., prior to step 310. In one example, the method 300 may be performed in connection with a non-visual user interface. For instance, the user selection(s) may be via a speech input via a speech/voice command interface, the presentation of the first content with an indication of whether the at least one second content relating to the at least one assertion corroborates or contradicts the at least one assertion at step 360 may be in audio format, and so forth. In still another example, a user may specifically request second content that is contradictory to the assertion. For example, the user may be interested in which content sources may be giving potentially opposing views (e.g., potentially false information or simply a variant approach), the user may wish to find second content that supports rebuttal arguments, and so forth. For instance, the latter example may be more useful in connection with assertions that are statements of opinion rather than fact. In one example, the method 300 may be expanded or modified to include steps, functions, and/or operations, or other features described above in connection with the example(s) of FIGS. 1 and 2, or as described elsewhere herein. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the examples of FIG. 2 or 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for presenting first content with an indication of whether second content identified as relating to an assertion in the first content corroborates or contradicts the assertion, and various input/output devices 406, e.g., one or more sensors, a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for presenting first content with an indication of whether second content identified as relating to an assertion in the first content corroborates or contradicts the assertion (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for presenting first content with an indication of whether second content identified as relating to an assertion in the first content corroborates or contradicts the assertion (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:
1. A method comprising:
obtaining, by a processing system including at least one processor, a first content comprising human language via at least one computing network;
identifying, by the processing system, at least one assertion in the first content, wherein the identifying comprises applying an open information extraction process to create a representation of the at least one assertion as a first formal relation comprising a first binary relation;
identifying, by the processing system, one or more content sources containing at least one second content relating to the at least one assertion;
determining, by the processing system, whether the at least one second content relating to the at least one assertion corroborates or contradicts the at least one assertion, wherein the determining whether the at least one second content corroborates or contradicts the at least one assertion comprises:
- identifying at least a second assertion in the at least one second content;
- creating a representation of the at least the second assertion as a second formal relation; and
- determining whether the second formal relation comprises an affirmation of the first formal relation or a negation of the first formal relation; and presenting, by the processing system, the first content with an indication of whether the at least one second content relating to the at least one assertion corroborates or contradicts the at least one assertion.

2. The method of claim 1, wherein the identifying the one or more content sources containing at least one second content relating to the at least one assertion comprises:
- obtaining the at least one second content;
- calculating a term frequency-inverse document frequency metric between the at least one second content and the first content; and
- determining that the at least one second content relates to the at least one assertion in response to the term frequency-inverse document frequency metric exceeding a threshold term frequency-inverse document frequency metric.

3. The method of claim 1, further comprising:
obtaining an input requesting a verification of the at least one assertion.

4. The method of claim 1, wherein the one or more content sources comprise:
- an online news source;
- a review website;
- an online journal;
- an online article repository; or
- an online encyclopedia.

5. The method of claim 1, wherein the first content comprises text.

6. The method of claim 5, wherein the text comprises:
- an article;
- a short message service message;
- a social-media posting;
- a posting to an online forum;
- a search result; or
- a comment added to a comment section for an online media content.

7. The method of claim 1, wherein the first content comprises speech.

8. The method of claim 7, wherein the identifying the at least one assertion in the first content comprises:
converting the speech to text via a speech recognition process.

9. The method of claim 1, wherein the identifying the one or more content sources containing the at least one second content relating to the at least one assertion comprises:
identifying the one or more content sources from among content sources having trust ratings above a threshold trust rating.

10. The method of claim 9, wherein for each content source of the one or more content sources, a trust rating is based upon at least one of:
- a user rating by a user to whom the first content is presented; or
- a number of times or a percentage of agreement regarding assertions of fact with other content sources having trust ratings above the threshold trust rating.

11. The method of claim 1, wherein the one or more content sources comprise at least one sensor device, and wherein the at least one second content comprises sensor data collected from the at least one sensor device.

12. The method of claim 11, wherein the at least one sensor device comprises:
- a microphone; or
- a camera.

13. The method of claim 11, wherein the identifying the one or more content sources includes identifying features from the sensor data, wherein the determining comprises determining whether the features from the sensor data corroborate or contradict the at least one assertion.

14. The method of claim 11, wherein the at least one sensor device is deployed at a location that is geographically relevant to the at least one assertion.

15. The method of claim 14, wherein the at least one assertion relates to the location.

16. A non-transitory computer-readable medium storing instructions which, when executed by a processing system including at least one processor, cause the processing system to perform operations, the operations comprising:
- obtaining a first content comprising human language via at least one computing network;
- identifying at least one assertion in the first content, wherein the identifying comprises applying an open information extraction process to create a representation of the at least one assertion as a first formal relation comprising a first binary relation;
- identifying one or more content sources containing at least one second content relating to the at least one assertion;
- determining whether the at least one second content relating to the at least one assertion corroborates or contradicts the at least one assertion, wherein the determining whether the at least one second content corroborates or contradicts the at least one assertion comprises:
  - identifying at least a second assertion in the at least one second content;
  - creating a representation of the at least the second assertion as a second formal relation; and
  - determining whether the second formal relation comprises an affirmation of the first formal relation or a negation of the first formal relation; and
- presenting the first content with an indication of whether the at least one second content relating to the at least one assertion corroborates or contradicts the at least one assertion.

17. An apparatus comprising:
- a processing system including at least one processor; and
- a computer-readable medium storing instructions which, when executed by the processing system, cause the processing system to perform operations, the operations comprising:
  - obtaining a first content comprising human language via at least one computing network;
  - identifying at least one assertion in the first content, wherein the identifying comprises applying an open information extraction process to create a representation of the at least one assertion as a first formal relation comprising a first binary relation;
  - identifying one or more content sources containing at least one second content relating to the at least one assertion;
  - determining whether the at least one second content relating to the at least one assertion corroborates or contradicts the at least one assertion, wherein the determining whether the at least one second content corroborates or contradicts the at least one assertion comprises:

identifying at least a second assertion in the at least one second content;

creating a representation of the at least the second assertion as a second formal relation; and determining whether the second formal relation comprises an affirmation of the first formal relation or a negation of the first formal relation; and presenting the first content with an indication of whether the at least one second content relating to the at least one assertion corroborates or contradicts the at least one assertion.

18. The apparatus of claim 17, wherein the identifying the one or more content sources containing at least one second content relating to the at least one assertion comprises:

obtaining the at least one second content;

calculating a term frequency-inverse document frequency metric between the at least one second content and the first content; and determining that the at least one second content relates to the at least one assertion in response to the term frequency-inverse document frequency metric exceeding a threshold term frequency-inverse document frequency metric.

19. The apparatus of claim 17, wherein the first content comprises text.

20. The apparatus of claim 19, wherein the text comprises:

an article;

a short message service message;

a social-media posting;

a posting to an online forum;

a search result; or a comment added to a comment section for an online media content.

\* \* \* \* \*